(12) United States Patent
Overby et al.

(10) Patent No.: US 12,103,715 B2
(45) Date of Patent: Oct. 1, 2024

(54) SPACECRAFT SHIELDING

(71) Applicant: Government of the United States, as represented by the Secretary of the Air Force, Wright-Patterson AFB, OH (US)

(72) Inventors: Kaleb D. Overby, Cambride, MA (US); Jonathon L. Gabriel, Riverdale Park, MD (US); Matthew H. Steiner, Beavercreek, OH (US); Joshua L. Budig, Beavercreek, OH (US); Eric R Clingenpeel, Colorado Springs, CO (US); Adam T. Broshkevitch, Purcellville, VA (US); Michael L Anderson, Colorado Springs, CO (US); Jason H. Niebuhr, Colorado Springs, CO (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 49 days.

(21) Appl. No.: 18/299,801

(22) Filed: Apr. 13, 2023

(65) Prior Publication Data

US 2023/0331404 A1    Oct. 19, 2023

Related U.S. Application Data

(60) Provisional application No. 63/332,033, filed on Apr. 18, 2022.

(51) Int. Cl.
  *B64G 1/56*    (2006.01)

(52) U.S. Cl.
  CPC .................................. *B64G 1/56* (2013.01)

(58) Field of Classification Search
  CPC .... B64G 1/56; B32B 1/00; B32B 3/00; B32B 3/28; F41H 5/0492
  See application file for complete search history.

(56) References Cited

U.S. PATENT DOCUMENTS

| 5,067,388 A | 11/1991 | Crews et al. |
| 5,610,363 A | 3/1997 | Crews et al. |

(Continued)

FOREIGN PATENT DOCUMENTS

| CN | 110524960 A | * 12/2019 | ............... B32B 3/04 |
| JP | 2011121476 A | 6/2011 | |

OTHER PUBLICATIONS

Gabriel, J. L.; Overby, K. D.; Steiner, M. J.; Clingenpeel, E. R.; Budig, J. L.; Broshkevitch, A. T.; Anderson, M. L; Niebuhr, J. H.; On-Orbit Additive Manufacturing for MMOD Protection, AIAA SciTech 22 Presentation Jan. 5, 2022, 1-15.

(Continued)

*Primary Examiner* — Richard G Davis
(74) *Attorney, Agent, or Firm* — AFMCLO/JAZ; James F. McBride

(57) ABSTRACT

The present invention relates to spacecraft shielding, articles comprising such shielding as well as processes of making and using spacecraft shielding and articles comprising such shielding. Such shields are made by a 3D process that provides significant shield geometry and composition flexibility and yields shields that have significantly improved shield performance. Such shields may be efficiently be manufactured in space.

24 Claims, 8 Drawing Sheets

(56) References Cited

U.S. PATENT DOCUMENTS

| | | |
|---|---|---|
| 8,151,685 B2 | 4/2012 | Joynt |
| 2006/0090636 A1 | 5/2006 | Yang et al. |
| 2009/0193749 A1* | 8/2009 | Gembol .................. E04B 1/20 52/649.1 |
| 2011/0283873 A1* | 11/2011 | Wadley .................... B32B 3/12 89/917 |
| 2012/0175467 A1 | 7/2012 | Dye et al. |
| 2015/0259081 A1 | 9/2015 | Albert et al. |
| 2016/0209178 A1* | 7/2016 | Bailey .................. F41H 5/0414 |
| 2019/0368842 A1* | 12/2019 | Xu ............................ F41H 5/06 |
| 2021/0061495 A1* | 3/2021 | Aston .................. B29C 64/153 |

OTHER PUBLICATIONS

Gabriel, J. L.; Overby, K. D.; Steiner, M. J.; Clingenpeel, E. R.; Budig, J. L.; Broshkevitch, A. T.; Anderson, M. L; Niebuhr, J. H.; On-Orbit Additive Manufacturing for MMOD Protection Dec. 1, 2021.

Google English language translation of JP2011121476A.

Jacob A. Rogers, J. A.; Mote, A.; Mead, P. T.; Harrison, K.; Lukasik, G. D.; Kota, K. R.; Kulatilaka, W. D.; Wilkerson, J. W.; Lacy Jr. T. E.; Hypervelocity impact response of monolithic UHMWPE and HDPE plates, International Journal of Impact Engineering 2022, 161, 104081, 1-11.

* cited by examiner

SPACECRAFT SHIELDING

CROSS-REFERENCE TO RELATED APPLICATION

The present application claims priority to U.S. Provisional Application Serial No. 63/332,033 filed Apr. 18, 2022, the contents of which is hereby incorporated by reference in their entry.

RIGHTS OF THE GOVERNMENT

The invention described herein may be manufactured and used by or for the Government of the United States for all governmental purposes without the payment of any royalty.

FIELD OF THE INVENTION

The present invention relates to spacecraft shielding, articles comprising such shielding as well as processes of making and using spacecraft shielding and articles comprising such shielding.

BACKGROUND OF THE INVENTION

Vehicles such as spacecraft are normally subjected to bombardment by particles and/or electromagnetic radiation that can severely damage or even disable such vehicles. With respect to spacecraft, the near-earth orbital environment is becoming more congested with hazardous space debris. There are multitudes of untraceable and uncountable micrometeoroids and orbital debris that travel at extremely high velocities (1-20 km/s), with enough impact energy to critically damage spacecraft. As a result, vehicles typically are equipped with some form of shielding.

Currently, vehicle shields are limited in their geometries and composition. Such limitations have resulted in shields that are complex to manufacture, do not have the blast deflection pattern and/or electromagnetic radiation resistance characteristics that are desired. Furthermore, current shields are assembled on earth, placed on the spacecraft of choice and then launched into orbit with such spacecraft. As the spacecraft and shielding must fit within the rocket used to launch the spacecraft, shield geometry and composition is limited due to rocket volume restrictions and launch stresses. Applicants recognized that the aforementioned shield geometry and composition problems could be mitigated by a shield three-dimensional (3D) printing process. The flexibility of such process resulted in Applicants recognition that the shield geometries disclosed herein yielded significantly improved shield performance.

SUMMARY OF THE INVENTION

The present invention relates to spacecraft shielding, articles comprising such shielding as well as processes of making and using spacecraft shielding and articles comprising such shielding. Such shields are made by a 3D process that provides significant shield geometry and composition flexibility and yields shields that have significantly improved shield performance. Such shields may be efficiently manufactured in space.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, which are incorporated in and constitute a part of this specification, illustrate embodiments of the present invention and, together with a general description of the invention given above, and the detailed description of the embodiments given below, serve to explain the principles of the present invention.

DETAILED DESCRIPTION OF THE INVENTION

Definitions

Figure 1A:
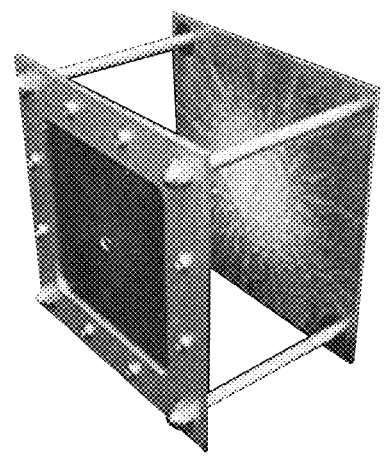
FIG. 1A is a color photograph presented as a comparative example of a traditional whipple shield for protecting satellites.

Unless specifically stated otherwise, as used herein, the terms "a", "an" and "the" mean "at least one".

As used herein, the terms "include", "includes" and "including" are meant to be non-limiting.

Unless otherwise noted, all component or composition levels are in reference to the active portion of that component or composition, and are exclusive of impurities, for example, residual solvents or by-products, which may be present in commercially available sources of such components or compositions.

All percentages and ratios are calculated by weight unless otherwise indicated. All percentages and ratios are calculated based on the total composition unless otherwise indicated.

As used herein, the words "about," "approximately," or the like, when accompanying a numerical value, are to be construed as indicating a deviation as would be appreciated by one of ordinary skill in the art to operate satisfactorily for an intended As used herein, the words "and/or" means, when referring to embodiments (for example an embodiment having elements A and/or B) that the embodiment may have element A alone, element B alone, or elements A and B taken together.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Shielding and Articles Comprising Same

For purposes of this specification, headings are not considered paragraphs. In this paragraph, Applicants disclose a shield, said shield comprising a bumper and one or more angled baffles in series, said bumper and said one or more angled baffles being separated by a gap between said bumper and each of said one or more angled baffles, said gap between said bumper and the initial baffle being at least 2 inches, preferably said gap between said bumper and the initial baffle being at least 2.25 inches, in one aspect, said gap between said bumper and the initial baffle is from about 2 inches to about 12 inches, said baffles have a gap between each baffle of said baffles being at least 0.5 inches, preferably said baffles have a gap between each baffle of said baffles being at least 1 inch, in one aspect, said gap between baffles is from about 0.5 inches to about 6 inches, said bumper being positioned in front of said one or more angled baffles, said bumper and said one or more angled baffles being connected by one or more supports;

a.) said bumper having an angle of with respect to said one or more supports of about 60 degrees to about 120 degrees, preferably said bumper having an angle of with respect to said one or more supports of about 80 degrees to about 100 degrees, more preferably said bumper having an angle of with respect to said one or more supports of about 85 degrees to about 95 degrees, most preferably said bumper having an angle of with respect to said one or more supports of about 90 degrees, said bumper comprising a polymeric material, a fiber and/or a metallic material;

b.) said one or more angled baffles having one or more angular sections, when any of said one or more angled baffles have one angular section, each said one angular section independently has an angle with respect to said one or more supports of about 95 degrees to about 110 degrees, preferably said baffle having an angle of with respect to said one or more supports of about 96 degrees to about 100 degrees, more preferably said baffle having an angle of with respect to said one or more supports of about 96.7 degrees, when any of said one or more angled baffles have two or more angular sections, each said angular section independently has an angle with respect to said one or more supports of about 30 degrees to about 60 degrees, preferably each said angular section independently has an angle with respect to said one or more supports of about 40 degrees to about 50 degrees, each said angular section independently has an angle with respect to said one or more supports of about 45 degrees, said one or more angled baffles having one or more angular sections comprising a polymeric material, a fiber and/or a metallic material.

Applicants disclose the shield of the previous paragraph comprising from 1 to about 10 baffles, preferably said shield comprises from 2 to about 5 baffles.

Applicants disclose the shield of the previous two paragraphs wherein each baffle independently has a thickness of at least 0.05 inches, preferably each baffle independently has a thickness of 0.1 inches to about 0.2 inches, more preferably each baffle independently has a thickness of about 0.125 inches.

Applicants disclose the shield of the previous two paragraphs comprising from 2 to about 5 adjacent baffles, each adjacent baffle being separated from any immediately adjacent baffle by a gap of at least 0.1 inches, in one aspect, each adjacent baffle is separated from any immediately adjacent baffle by a gap of about 0.1 inches to about 1 inch.

Applicants disclose the shield of the previous four paragraphs wherein each bumper independently has a thickness of at least 0.05 inches, preferably each bumper independently has a thickness of 0.1 inches to about 0.3 inches, more preferably each bumper independently has a thickness of about 0.125 inches.

Applicants disclose the shield of the previous four paragraphs wherein each baffle independently has a thickness of at least 0.025 inches, preferably each bumper independently has a thickness of 0.05 inches to about 0.3 inches, more preferably each bumper independently has a thickness of about 0.1 inches.

Applicants disclose the shield of the previous five paragraphs wherein a.) said polymeric material comprises a polymer selected from polyetherimide, acrylonitrile butadiene styrene, nylon, acrylonitrile styrene acrylate, polyether ether ketone, polyetherketoneketone and mixtures thereof; preferably said polymeric material comprises a polymer selected from polyetherimide, polyether ether ketone, polyetherketoneketone and mixtures thereof; most preferably said polymeric material comprises polyetherimide;

b.) said metallic material comprises a metal selected from the group consisting of Inconel, aluminum, steel, titanium and mixtures thereof, preferably said metallic material comprises a metal selected from the group consisting of aluminum; and c.) said fiber material comprises carbon fiber, glass fiber, kevlar fiber and mixtures thereof, preferably said fiber material comprises carbon fiber. Suitable polymeric materials can be obtained from 3DXTech, of Grand Rapids, Michigan, suitable steel and Inconel materials can be obtained available from Markforged, of Watertown, Massachusetts and suitable fibers and fiber mixes can be obtained from 3DXTech, of Grand Rapids, Michigan.

Applicants disclose the shield of the previous six paragraphs, said shield comprising polyetherimide.

Applicants disclose the shield of the previous seven paragraphs, said shield comprising polyetherimide and carbon fiber.

Applicants disclose the shield of the previous eight paragraphs wherein said baffles comprise zig-zag baffles, parapet baffles and/or dodecahedron baffles.

Applicants disclose a vehicle comprising a shield according to the previous nine paragraphs, preferably said vehicle is a spacecraft, aircraft, ship or land vehicle, preferably said spacecraft is a satellite, a space station, a space shuttle and/or an interplanetary vehicle, preferably said land vehicle is a tank, mine resistant ambush protected known as an MRAP, or a Hummer.

Detailed Description of the Figures

FIGS. 1 through 8 disclose results associated with the use of Applicants' shield as well as non-limiting embodiments of such shield.

FIG. 1A is a color photograph presented as a comparative example of a traditional Whipple shield for protecting satellites.

Figure 1B:
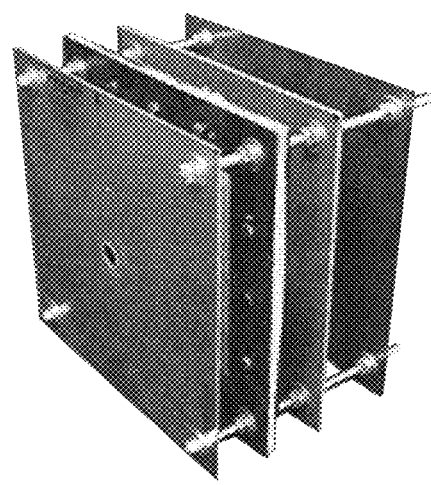
FIG. 1B is a color photograph presented as a comparative example of a stuffed whipple shield for protecting satellites.

FIG. 1B is a color photograph presented as a comparative example of a stuffed Whipple shield for protecting satellites.

Figure 1C:
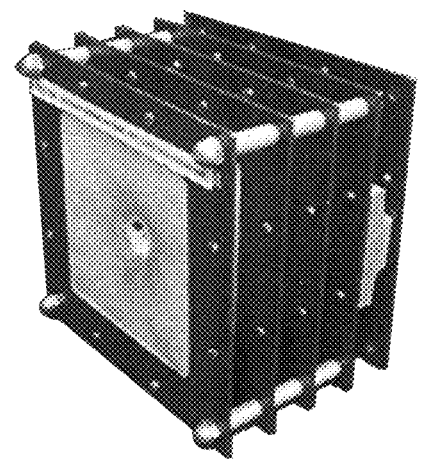
FIG. 1C is a color photograph presented as a comparative example of a multi-shock whipple shield for protecting satellites.

FIG. 1C is a color photograph presented as a comparative example of a multi-shock Whipple shield for protecting satellites.

Figure 2:
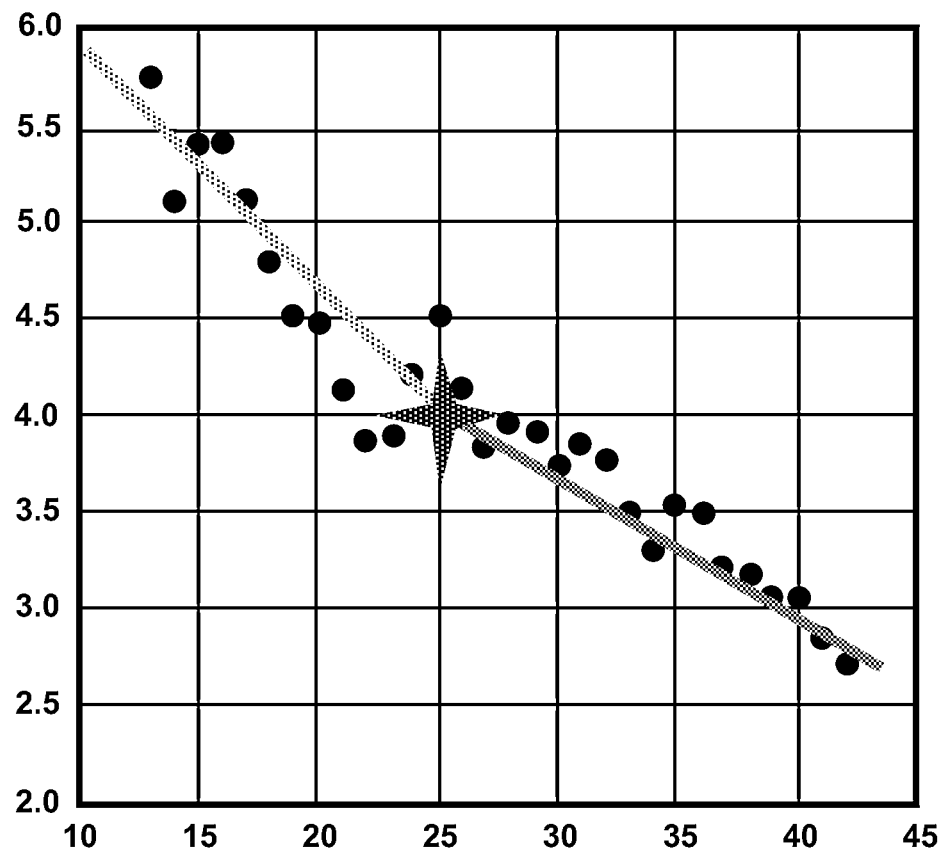
FIG. 2 is a plot of the Back Face debris cloud velocity after an MMOD particle has penetrated the front bumper of a shield plate made of Ultem® 1010.

FIG. 2 is a plot of the Back Face debris cloud velocity after an MMOD particle has penetrated the front bumper of a shield plate made of Ultem® 1010.

Figure 3:
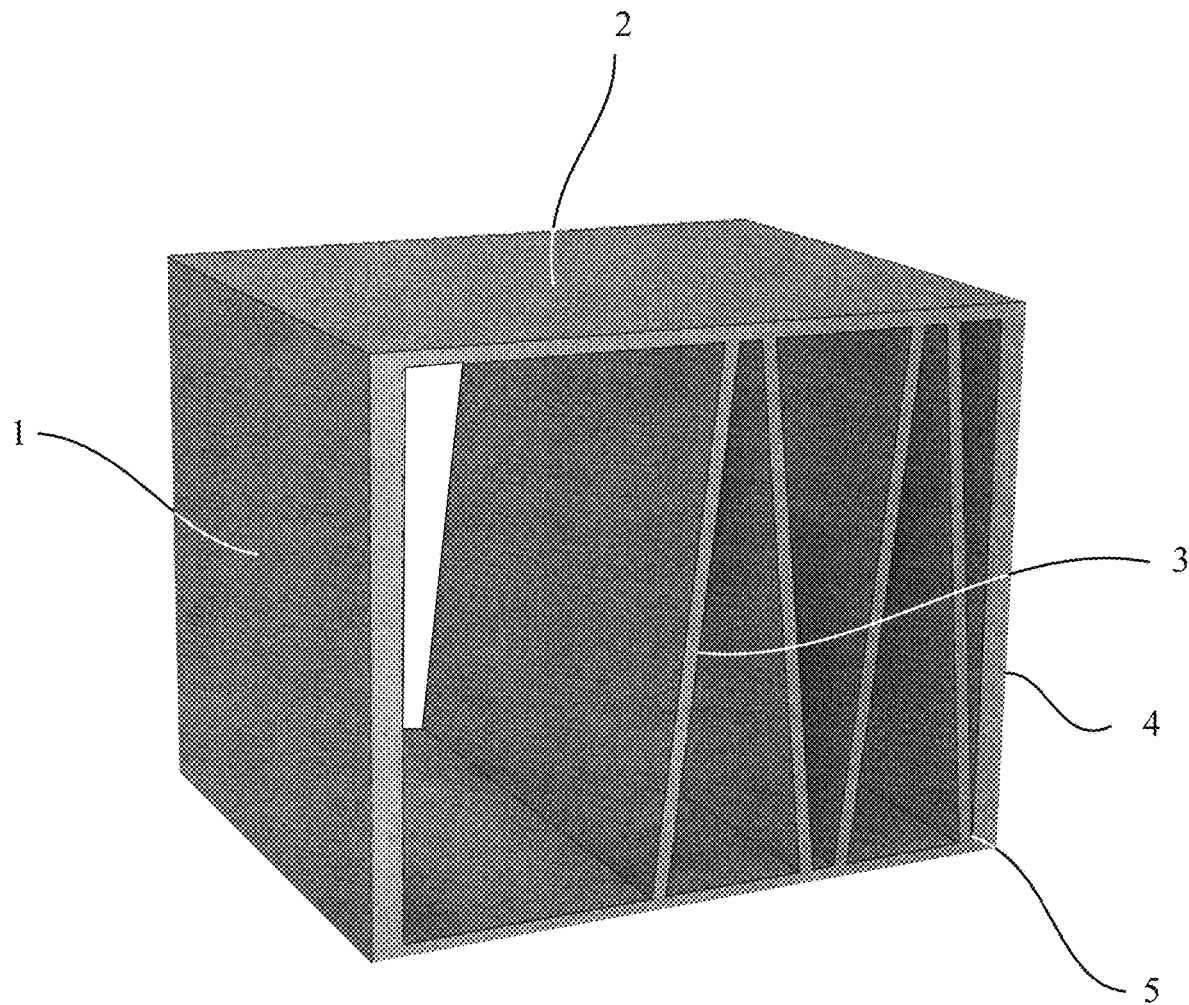
FIG. 3 is an isometric view of the Oblique Wall shield design.

FIG. 3 is an isometric view of the Oblique Wall shield design showing front bumper 1, top support 2, baffles 3, rear support 4 and baffle connection point to bottom support 5.

Figure 4:
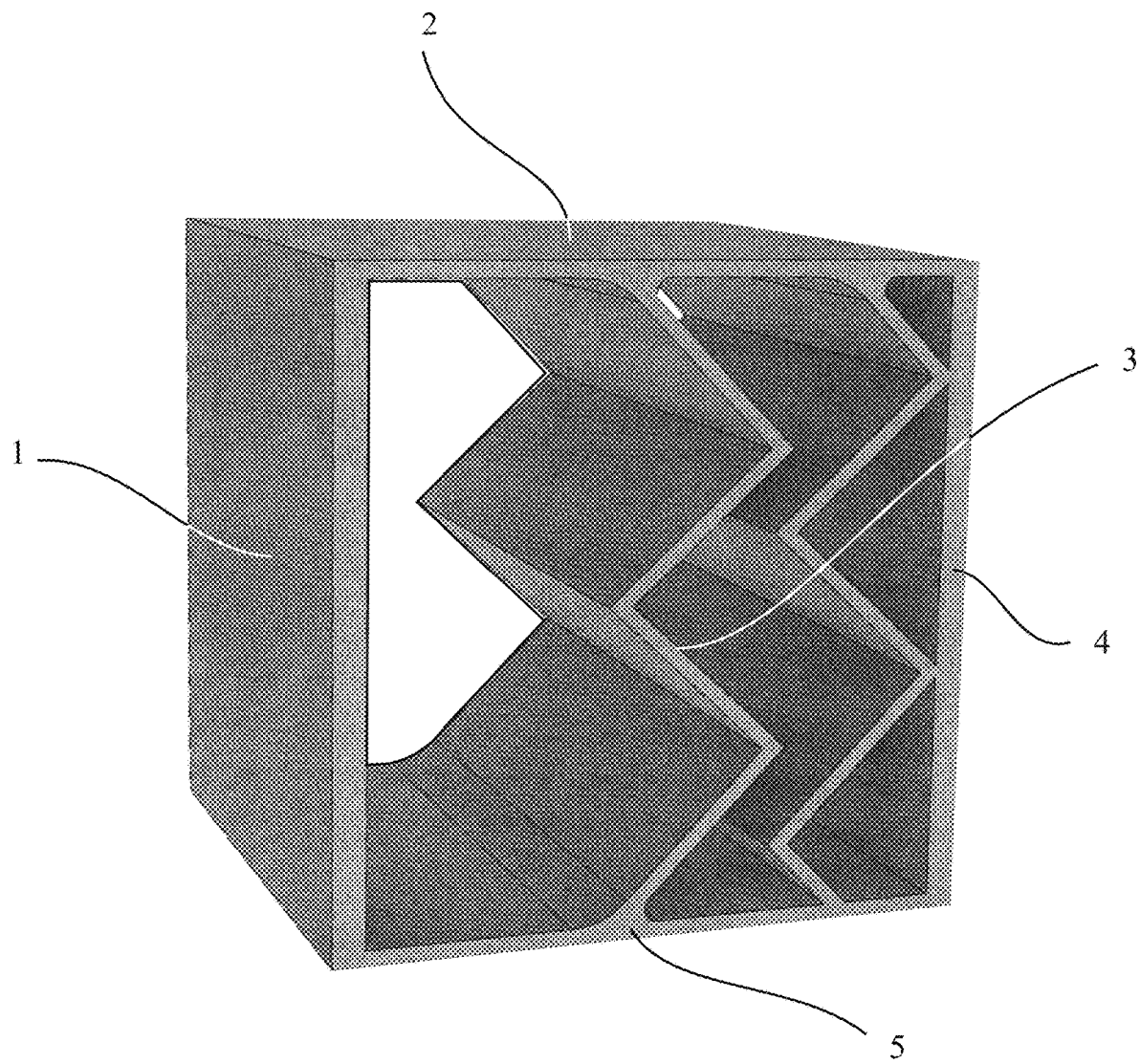
FIG. 4 is an isometric view of Zig-Zag shield design.

FIG. 4 is an isometric view of Zig-Zag shield design showing front bumper 1, top support 2, baffles 3, rear support 4 and baffle connection point to bottom support 5.

Figure 5:
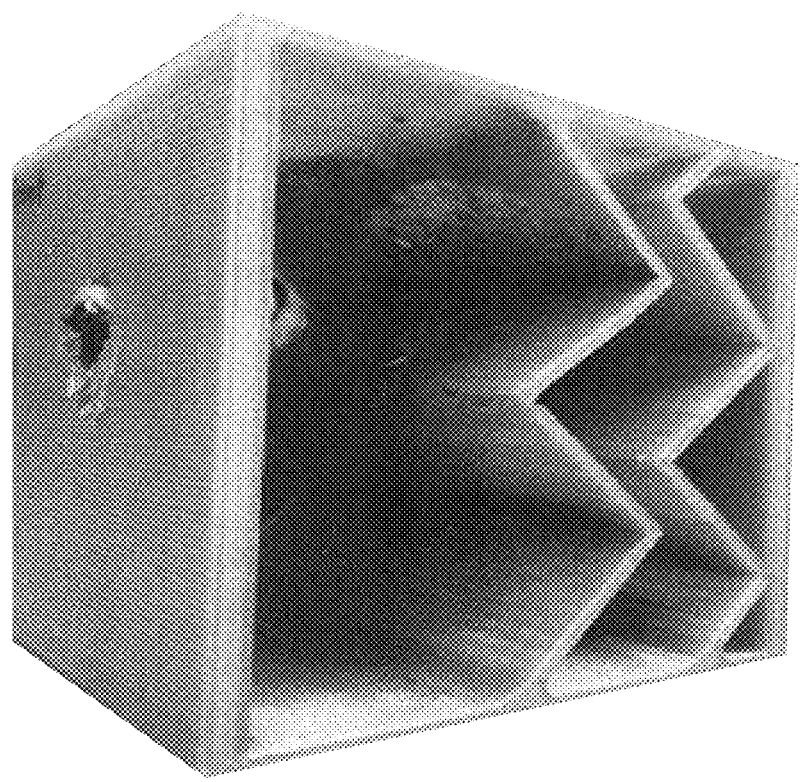
FIG. 5 is a color photograph of a Zig-Zag shield after a successful impact test with a 6 km/s projectile.

FIG. 5 is a color photograph of a Zig-Zag shield after a successful impact test with a 6 km/s projectile.

Figure 6:
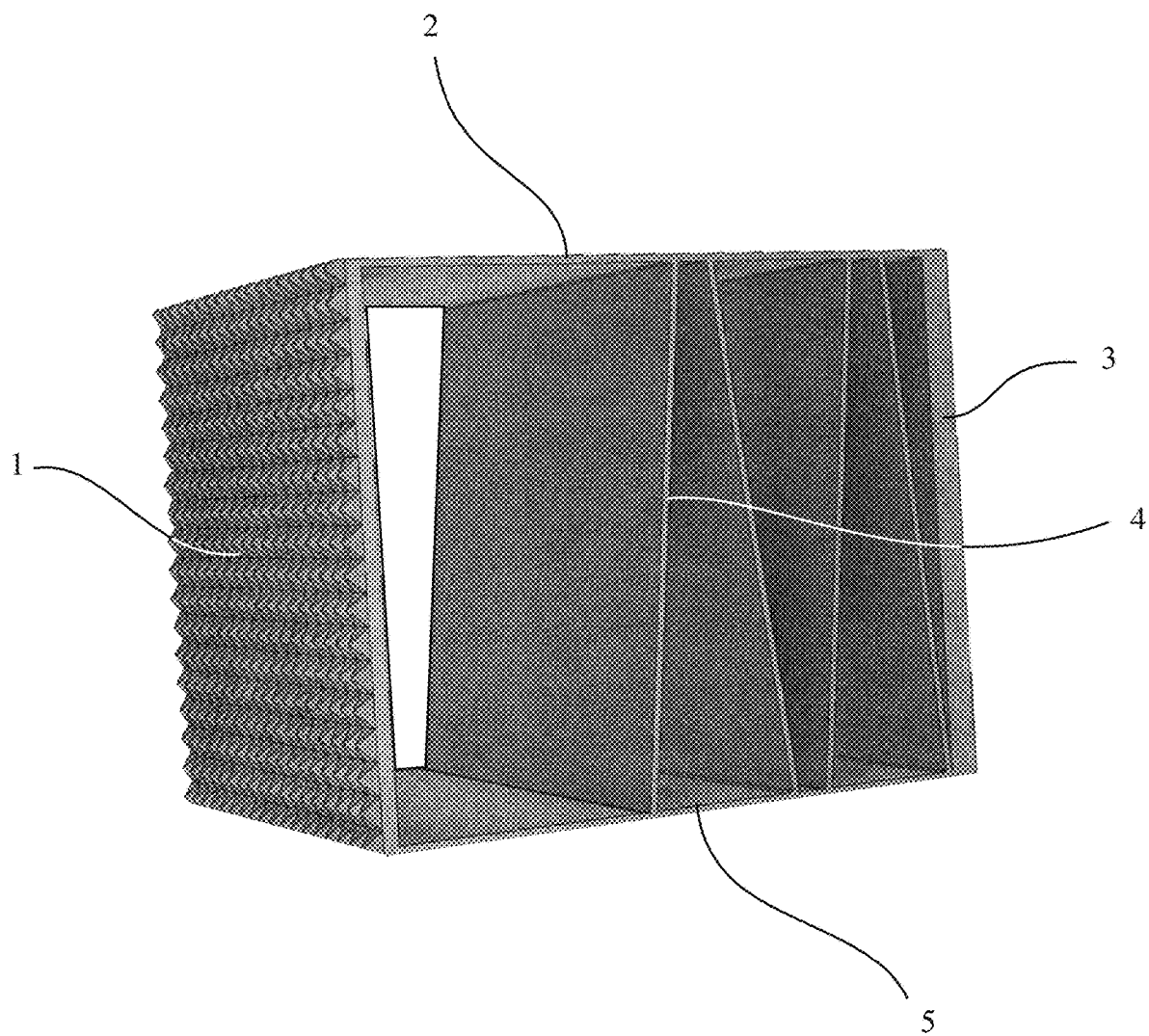
FIG. 6 is an isometric view of the Oblique Wall with Parapets shield design.

FIG. 6 is an isometric view of the Oblique Wall with Parapets shield design front bumper 1, top support 2, rear support 3, baffles 4 and bottom support 5.

Figure 7A:
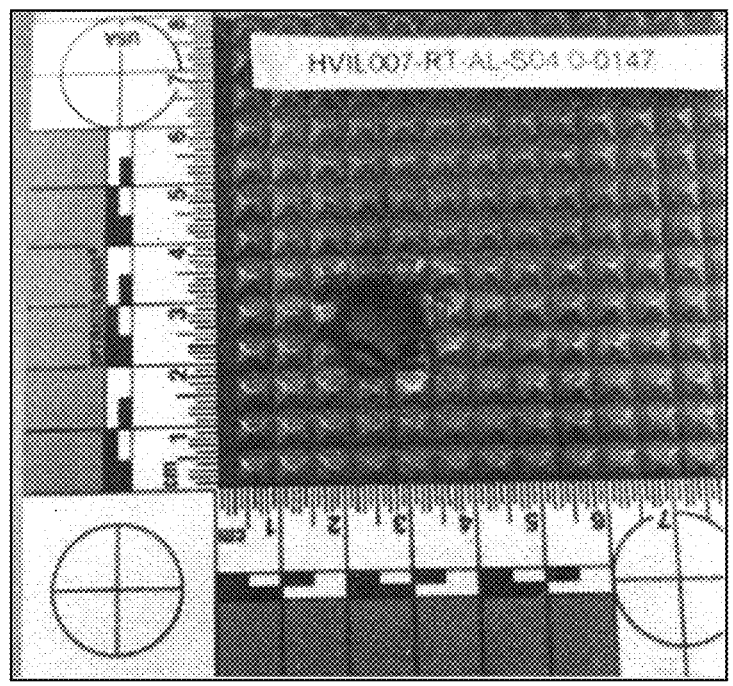
FIG. 7A is a color photograph of the front of an Oblique Wall with Parapets shield after a successful impact test with a 6 km/s projectile.

FIG. 7A is a color photograph of the front of an Oblique Wall with Parapets shield after a successful impact test with a 6 km/s projectile.

Figure 7B:
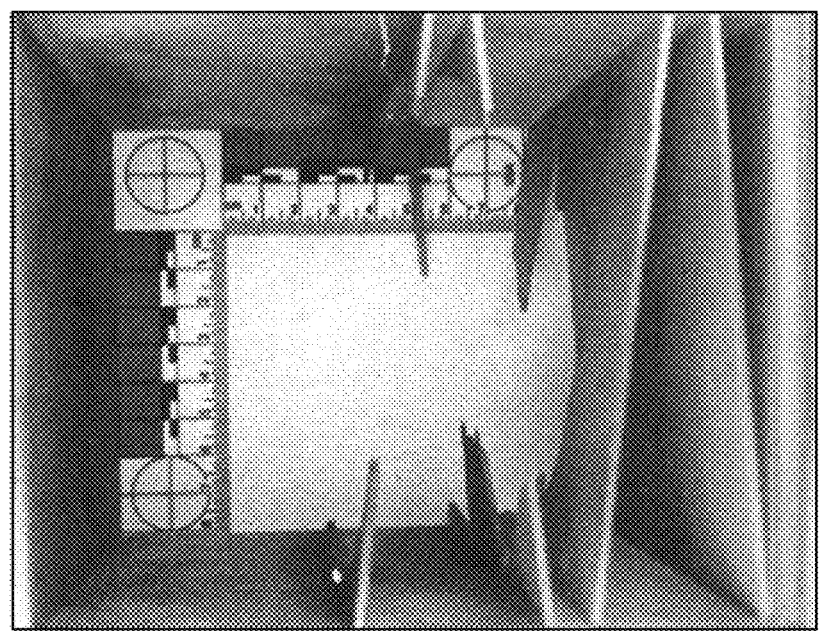
FIG. 7B is a color photograph of the side of an Oblique Wall with Parapets shield after a successful impact test with a 6 km/s projectile.

FIG. 7B is a color photograph of the side of an Oblique Wall with Parapets shield after a successful impact test with a 6 km/s projectile.

Figure 8:
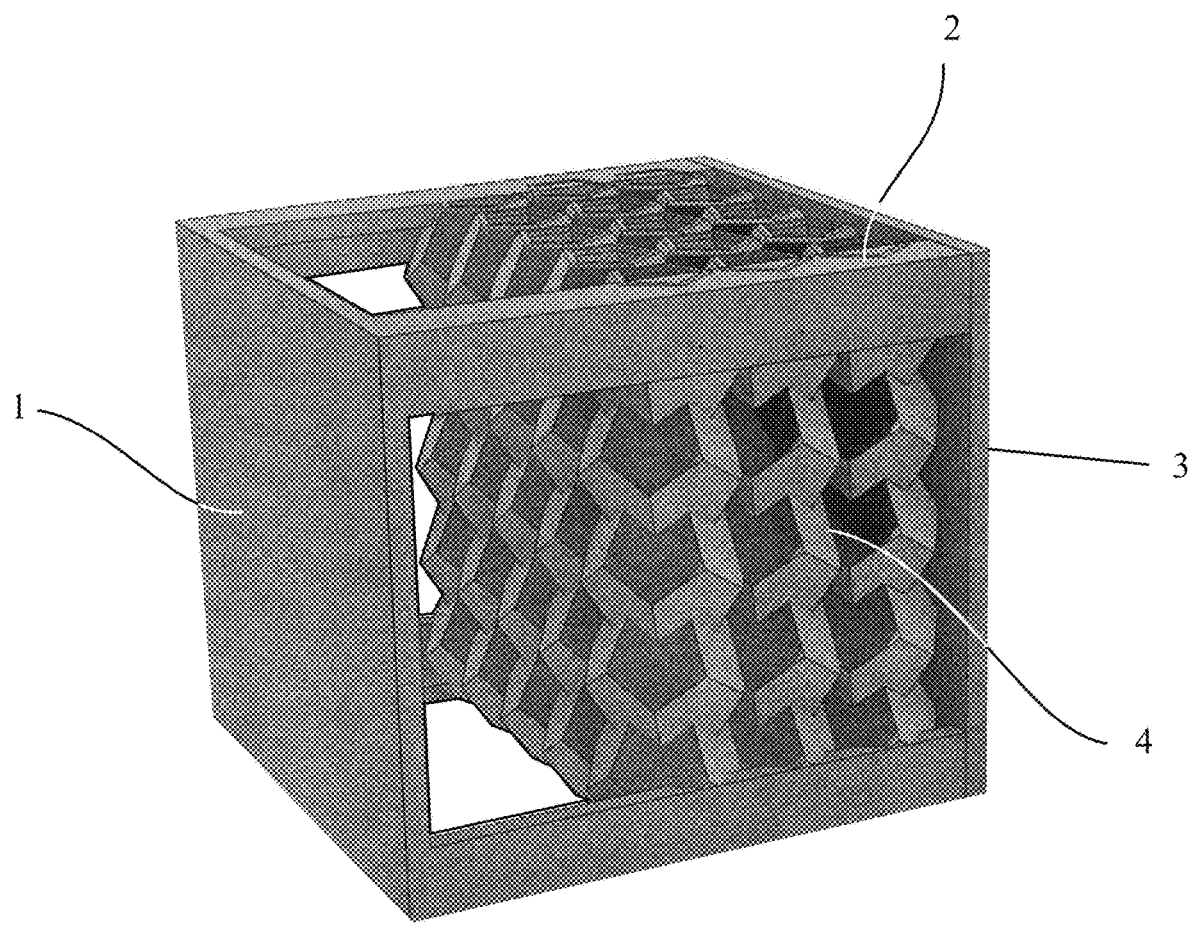
FIG. 8 is an isometric view of a Dodecahedron shield design.

FIG. 8 is an isometric view of a Dodecahedron shield design showing front bumper 1, top support 2, rear support 3 and baffles 4.

Test Methods

Method to Determine Shield Performance. Test the shield by firing a projectile at it with the use of a two-stage light gas gun from Physics Applications, Inc. Dayton, Ohio 45458 USA. In addition to items listed in 1.) through 6.) below the test requires Piston, Tube, Pump P/N 1564028 and 20 EA. Petal Vale 0.020" Score, P/N 1018194-2 from Physics Applications, Inc. Dayton, Ohio 45458 USA. The "piston" is a plastic cylinder that is propelled by gunpowder down the barrel of the first stage in order to compress the gas (hydrogen). The "petal valve" is on the far end of the first stage chamber and contains the gas so it can be compressed. It is carefully designed to rupture at a predefined pressure. When it ruptures, it exposes the compressed gas to the sabot, propelling the sabot down the barrel.

1.) Place the shield in the sealed test chamber and evacuate the chamber.
2.) Prepare the projectile. The projectile package consists of a spherical aluminum projectile (2017 Aluminum, 4 mm dia, 0.090 grams) surrounded by a four-piece polymer sabot "Serrated Sabot ST801 for 4 mm Cavity," P/N 1655301 supplied by Physics Applications, Inc. Dayton, Ohio 45458 USA.
3.) Fire the projectile at the center of the target at 6,000 m/s.
4.) Projectile velocity is measured by a laser velocimeter system which consists of a pair of laser light beams that are broken when the projectile passes through. Velocity is determined by measuring the time of flight between laser measurements.
5.) Post impact measurements are performed with the use of a high speed camera (Shimadzu HPV-X2 high-speed camera with a max frame rate of 10 M frames per second (fps)).
6.) Measure the velocity of the resulting debris cloud with the high-speed camera with the assistance of Tracker, open-source motion tracking software.

General information concerning impact testing can be found in Rogers et al. International Journal of Impact Engineering 161 (2022) 104081.

EXAMPLES

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

Example 1 Oblique Wall Shield Design

The Oblique Wall shield prototype (FIG. 3) was created through a 3D printing process. This involves an engineer first developing a Computer-Aided Design (CAD) model with appropriate software. Autodesk Fusion 360 2.0.10806 was used. For the Oblique Wall shield, the model consists of a cube shape with outer dimensions of 4.5 in W×4.5 in H×5.5 in D. The front bumper plate is 0.125 in thick and the rear wall plate is 0.25 in thick. The top and bottom walls of the cube are 0.125 in thick. There are no sidewalls of the cube, so that the debris cloud can escape out of the sides. There are 4 oblique baffle walls in the interior of the cube. These baffles are rotated about a horizontal axis that is parallel to the front edge of the cube an amount of 6.7 degrees off of the vertical. These rotated oblique baffle walls alternate between a reward lean and a forward lean. These interior baffles are 0.125 in thick and they span the entire width and height of the cube. The first interior baffle is located a horizontal distance of 2.25 in behind the front surface of the bumper plate, from which point, it is angled backward at 6.7 degrees, such that its intersection with the top of the cube occurs at a point approximately 2.62 in from the interior wall of the front bumper wall. The second oblique baffle begins 0.25 in from the nearest point of the preceding baffle, angled 6.7 degrees in the opposite direction such that the distances between the first interior oblique baffle wall and second interior oblique baffle wall are 0.25 in at their nearest approach and 1.25 in at their greatest separation. This pattern continues with the $3^{rd}$ and $4^{th}$ interior baffles. These models are exported as an "STL" file type (STereoLithography) by the Autodesk Fusion software which is a standard file used by 3D printers. The prototypes were printed on a Stratasys Fortus 450 mc Fused Deposition Modeling (FDM) printer, which can be obtained from Stratasys, Inc. The STL part file is imported to a computer that controls the Stratasys Fortus 450 mc 3D printer, where it is opened, oriented, and prepared for printing by Stratasys GrabCad software. The filament material is Ultem 9085 which can be obtained from Stratasys, Inc. Once the printing process is completed, the finished part is removed from the print bed and it is installed on a spacecraft by the spacecraft manufacturer prior to launch. They could be printed and installed on spacecraft on Earth, before the spacecraft is launched into orbit.

Example 2 3D Printing and Installation in Space

In an alternative implementation, the shield is 3D printed in space by an appropriate machine installed on a spacecraft. The On-Orbit Servicing, Assembly, and Manufacturing 2 (OSAM-2) spacecraft is such a machine. In this example, the part file is developed and prepared for printing according to Example 1. The prepared file is then uploaded to the OSAM-2 spacecraft which prints the shield. Once printed, a robotic assembly arm removes it from the printer and places it on the satellite to be protected. Such shield is adhered to and or fastened to such satellite.

Example 3 3D Printing on Earth and Installation in Space

In an alternative implementation, the shield is 3D printed on Earth according to Example 1. After printing, the shield is transported to space on a satellite servicing vehicle. The servicing vehicle approaches the satellite in need of shielding and installs the shield on said satellite, with a robotic arm according to Example 2.

Example 4 Shielding Installation by Astronaut

In an alternative implementation, the shield is 3D printed on Earth according to Example 1, and transported to space by a servicing mission, according to Example 3, or it is 3D printed in space, according to Example 2. Once in space, the shielding is installed by an astronaut.

Example 5 Zig-Zag Shield Design

The Zig-Zag shield prototype (FIG. 4) was created through a 3D printing process according to Example 1, except for the following modifications. For the Zig-Zag shield, the model consists of a cube shape with outer dimensions of 5 in W×5 in H×5 in D. The front bumper plate is 0.125 in thick and the rear wall plate is 0.25 in thick. The top and bottom walls of the cube are 0.125 in thick. There are no side walls of the cube, so that the debris cloud can escape out of the sides. There are 2 zig-zag-shaped baffle walls in the interior of the cube which. These zig-zag baffles consist of 4 to 5 joined rectangular segments that span the width of the cube, and are rotated forward and backward an amount of 45 degrees off of the vertical to create a zig-zag shape when viewed from the side. The rectangular zig-zag segments are 5 in wide and about 1.68 in high, except where they terminate into the top or bottom wall. These zig-zag baffles are staggered by 0.5 in in the vertical direction so that the front baffle can nest partially in the rear baffle. These interior baffles are 0.125 in thick and they span the entire width and height of the cube. The first interior baffle initiates at a point on the top wall located a horizontal distance of 2.25 in from the front surface of the front bumper plate. From this point on the top wall, the baffle's first segment is angled rearward at 45 degrees, continuing for about 1.5 in, then it intersects the second segment, which is rotated forward at 45 degrees, continuing for about 1.68 in, then it intersects the 3rd segment, angled rearward and so on, until the bottom wall is intersected. Once the part design is complete, the file is prepared and the shield printed according to Example 1.

Example 6 Oblique Wall with Parapets Shield Design

The Oblique Wall with Parapets shield prototype (FIG. 6, FIGS. 7A and 7B) was created through a 3D printing process according to Example 1, except for the following modifications. The interior geometry is that of the Oblique Wall Shield of Example 1. On the front (exterior) surface of the front bumper wall, the shield includes 324 pyramid-shaped parapets, arranged in an 18×18 square pattern. Each parapet has dimensions 0.25 in W×0.25 in H×0.125 in D. The point of each pyramid extends toward the front. Once the part design is complete, the file is prepared and the shield printed according to Example 1.

Example 7 Dodecahedron Shield Design

The Dodecahedron shield prototype (FIG. 8) was created through a 3D printing process according to Example 1, except for the following modifications. The dodecahedron shield consists of a cube shape with outer dimensions of 6.1 M W×5.8 in H×6.5 in D Instead of separated interior baffle walls, the dodecahedron shield design includes an array of conjoined and intersecting sphere-like dodecahedrons. The dodecahedrons begin at a point 2.5 in from the front of the front bumper plate. The array is 5 wide, 5 high and 3 deep. Each dodecahedron is defined by the length of the vertices, which are all about 0.62 in, resulting in a total height of about 1.32 in and width of about 1.7 in, with a wall thickness of about 0.059 in. The dodecahedrons overlap in the vertical direction such that the 5-high wall is 5.8 in high, or an overlap of 0.2 in in the vertical direction. The dodecahedrons overlap along the width such that the 5-wide wall is 6.1 in wide, or an overlap of 0.6 in along the width. The dodecahedrons overlap along the depth such that the 3-deep wall is 4 in deep, or an overlap of 0.55 in along the depth. Once the part design is complete, the file is prepared and the shield printed according to Example 1.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A shield, said shield comprising a bumper and one or more angled baffles in series, said bumper and said one or more angled baffles being separated by a gap between said bumper and each of said one or more angled baffles, said gap between said bumper and the initial baffle being at least 2 inches, said baffles have a gap between each baffle of said baffles being at least 0.5 inches, said bumper being positioned in front of said one or more angled baffles, said bumper and said one or more angled baffles being connected by one or more supports;

a) said bumper having an angle of with respect to said one or more supports of about 60 degrees to about 120 degrees, said bumper comprising a polymeric material, a fiber and/or a metallic material;

b) said one or more angled baffles having one or more angular sections, when any of said one or more angled baffles have one angular section, each said one angular section independently has an angle with respect to said one or more supports of about 95 degrees to about 110 degrees, and when any of said one or more angled baffles have two or more angular sections, each said angular section independently has an angle with respect to said one or more supports of about 30 degrees to about 60 degrees, said one or more angled baffles having one or more angular sections comprising a polymeric material, a fiber and/or a metallic material.

2. The shield of claim 1, wherein said gap between said bumper and the initial baffle is at least 2.25 inches, said baffles have a gap between each baffle of said baffles of at least 1 inch,
   a) said bumper having an angle of with respect to said one or more supports of about 90 degrees to about 100 degrees;
   b) said one or more angled baffles having one or more angular sections, when any of said one or more angled baffles have one angular section, each said one angular section independently has an angle with respect to said one or more supports about 96 degrees to about 100 degrees, and when any of said one or more angled baffles have two or more angular sections, each said angular section independently has an angle with respect to said one or more supports of about 40 degrees to about 50 degrees.

3. The shield of claim 1, wherein said gap between said bumper and the initial baffle is from about 2 inches to about 12 inches and said gap between baffles is from about 0.5 inches to about 6 inches:
   a) said bumper having an angle of with respect to said one or more supports of about 85 degrees to about 95 degrees;
   b) said one or more angled baffles having one or more angular sections, when any of said one or more angled baffles have one angular section, each said one angular section independently has an angle with respect to said one or more supports of about 96.7 degrees and when any of said one or more angled baffles have two or more angular sections, each said angular section independently has an angle with respect to said one or more supports of about 45 degrees.

4. The shield of claim 1, wherein said bumper has an angle of with respect to said one or more supports of about 90 degrees.

5. The shield of claim 1 comprising from 1 to about 10 baffles.

6. The shield of claim 5 said shield comprising from 2 to about 5 baffles.

7. The shield of claim 1 wherein each baffle independently has a thickness of at least 0.05 inches.

8. The shield of claim 7 wherein each baffle independently has a thickness of 0.1 inches to about 0.2 inches.

9. The shield of claim 8 wherein each baffle independently has a thickness of about 0.125 inches.

10. The shield of claim 1 wherein each baffle independently has a thickness of at least 0.025 inches.

11. The shield of claim 10 wherein each baffle independently has a thickness of 0.05 inches to about 0.2 inches.

12. The shield of claim 11 wherein each baffle independently has a thickness of about 0.1 inches.

13. The shield of claim 1 comprising from 2 to about 5 adjacent baffles, each adjacent baffle being separated from any immediately adjacent baffle by a gap of at least 0.1 inches.

14. The shield of claim 13 wherein each adjacent baffle is separated from any immediately adjacent baffle by a gap of about 0.1 inches to about 1 inch.

15. The shield of claim 1 wherein each bumper independently has a thickness of at least 0.05 inches.

16. The shield of claim 15 wherein each bumper independently has a thickness of 0.1 inches to about 0.3 inches.

17. The shield of claim 16 wherein each bumper independently has a thickness of about 0.125 inches.

18. The shield of claim 1 wherein each bumper independently has a thickness of at least 0.025 inches.

19. The shield of claim 18 wherein each bumper independently has a thickness of 0.05 inches to about 0.3 inches.

20. The shield of claim 19 wherein each bumper independently has a thickness of about 0.1 inches.

21. The shield of claim 1 wherein said baffles comprise zig-zag baffles, parapet baffles and/or dodecahedron baffles.

22. A vehicle comprising a shield according to claim 1.

23. The vehicle of claim 22, said vehicle being a spacecraft, aircraft, ship or land vehicle.

24. The vehicle of claim 23 wherein said spacecraft is a satellite, a space station, a space shuttle and/or an interplanetary vehicle, and said land vehicle is a tank, mine resistant ambush protected known as an MRAP, or a Hummer.

* * * * *